(12) United States Patent
Han

(10) Patent No.: US 6,299,819 B1
(45) Date of Patent: Oct. 9, 2001

(54) DOUBLE-CHAMBER VACUUM RESIN TRANSFER MOLDING

(75) Inventor: Kerang Ken Han, Dayton, OH (US)

(73) Assignee: The University of Dayton, Dayton, OH (US)

( * ) Notice: Subject to any disclaimer, the term of this patent is extended or adjusted under 35 U.S.C. 154(b) by 0 days.

(21) Appl. No.: 09/335,617

(22) Filed: Jun. 18, 1999

Related U.S. Application Data
(60) Provisional application No. 60/094,282, filed on Jul. 27, 1998.

(51) Int. Cl.$^7$ ............................. B29C 70/44; B29C 70/48
(52) U.S. Cl. ..................... 264/510; 264/571; 425/129.1; 425/389; 425/390; 425/405.1
(58) Field of Search ................................. 264/510, 571; 425/129.1, 389, 390, 405.1

(56) References Cited

U.S. PATENT DOCUMENTS

| | | | |
|---|---|---|---|
| 4,120,632 | 10/1978 | Stoeberl | 425/405.1 |
| 4,303,608 * | 12/1981 | Ticker et al. | 425/175 |
| 4,551,085 | 11/1985 | Epel et al. | 425/405.1 |
| 4,732,639 * | 3/1988 | Newsom | 425/389 |
| 4,767,308 | 8/1988 | Adams | 425/405.1 |
| 4,902,215 | 2/1990 | Seemann, III | 425/406 |
| 4,943,222 | 7/1990 | Nathoo | 425/89 |
| 4,946,640 | 8/1990 | Nathoo | 264/316 |
| 5,087,193 * | 2/1992 | Herbert, Jr. | 425/389 |
| 5,114,637 * | 5/1992 | Williams et al. | 425/388 |
| 5,151,277 | 9/1992 | Bernardon et al. | 425/112 |
| 5,256,366 * | 10/1993 | Wejrock et al. | 264/571 |
| 5,316,462 | 5/1994 | Seemann | 425/112 |
| 5,433,165 | 7/1995 | McGuiness et al. | 264/571 |
| 5,439,635 | 8/1995 | Seemann | 264/510 |
| 5,441,692 * | 8/1995 | Taricco | 425/129.1 |
| 5,518,385 | 5/1996 | Graff | 425/127 |
| 5,526,767 | 6/1996 | McGuiness et al. | 264/571 |
| 5,665,301 | 9/1997 | Alanko | 264/571 |
| 5,676,979 | 10/1997 | Folsom et al. | 425/13 |
| 5,683,646 | 11/1997 | Reiling, Jr. | 264/512 |
| 5,716,488 * | 2/1998 | Bryant | 425/388 |

* cited by examiner

*Primary Examiner*—Robert Davis
(74) *Attorney, Agent, or Firm*—Killworth, Gottman, Hagan & Schaeff, L.L.P.

(57) ABSTRACT

A double chamber vacuum resin transfer molding process is provided comprising the initial step of providing a double chamber vacuum resin transfer molding apparatus comprising a first mold portion and a second mold portion. The first mold portion and the second mold portion are configured such that, in an engaged state, the first mold portion and the second mold portion define a mold cavity and a brim cavity. The mold cavity is isolated from the brim cavity by a compressible seal. Either or both of the first mold portion and the second mold portion are further configured to define an injection gate in communication with the mold cavity, a mold cavity vacuum port in communication with the mold cavity, and a brim cavity vacuum port in communication with the brim cavity. The first mold portion, the second mold portion, and the compressible seal are arranged such that a decrease in brim cavity pressure below atmospheric pressure causes a corresponding decrease in mold cavity volume. A preform is provided and the molding apparatus is arranged in the engaged state such that the preform is positioned in the mold cavity. A resin is injected into the mold cavity via the injection gate. The mold cavity and the brim cavity are evacuated so as to compress the compressible seal, decrease the brim cavity pressure, decrease the mold cavity volume, and cause the injected resin to infiltrate the preform. The resin is cured in the mold cavity by maintaining the evacuated state in the brim cavity for an amount of time sufficient to cure the resin.

26 Claims, 5 Drawing Sheets

DOUBLE-CHAMBER VACUUM RESIN TRANSFER MOLDING

CROSS-REFERENCE TO RELATED APPLICATIONS

This application claims the benefit of U.S. Provisional Application Serial No. 60/094,282, filed Jul. 27, 1998.

BACKGROUND OF THE INVENTION

The present invention relates to composite fabrication and, more particularly, to a double chamber vacuum resin transfer molding scheme having applications in the fabrication of fiber reinforced polymer, ceramic matrix, and carbon-carbon composites.

A number of different resin transfer molding processes are described in the prior art. For example, U.S. Pat. No. 5,518,385, teaches a resin transfer molding process wherein the reinforcing material or preform is degassed in an uncompressed condition prior to impregnation of the material with the resin. A different method of fabricating a composite structure is described in U.S. Pat. No. 5,683,646, wherein is disclosed a specialized approach for fabricating long and narrow composite structures using fiber/matrix and foam materials. Despite the efforts evident in the teachings of these and other patent documents, there is a continuing need in the fiber reinforced composite industry for versatile, effective, and low cost methods for fabricating fiber reinforced composites.

BRIEF SUMMARY OF THE INVENTION

This need is met by the present invention wherein a double chamber vacuum resin transfer molding scheme is provided including a compressible seal defining the boundary between a mold cavity and a brim cavity of the molding apparatus. Specific embodiments of the present invention incorporate a hybrid process of vacuum bag molding and resin transfer molding.

In accordance with one embodiment of the present invention, a double chamber vacuum resin transfer molding apparatus is provided comprising a first mold portion and a second mold portion. The first mold portion and the second mold portion are configured such that, in an engaged state, the first mold portion and the second mold portion define a mold cavity and a brim cavity. The mold cavity is isolated from the brim cavity by a compressible seal. Either the first mold portion, the second mold portion, or both, are further configured to define an injection gate in communication with the mold cavity, a mold cavity vacuum port in communication with the mold cavity, and a brim cavity vacuum port in communication with the brim cavity. The first mold portion, the second mold portion, and the compressible seal are arranged such that a decrease in brim cavity pressure below atmospheric pressure causes a corresponding decrease in mold cavity volume.

Preferably, the brim cavity is arranged about the periphery of the mold cavity and the first and second mold portions define respective first and second complementary geometrical profiles. Either the first mold portion, the second mold portion, or both, may be configured to define a plurality of elongated mold portion voids formed in a surface bounding at least a portion of the mold cavity. The elongated mold portion voids may comprise a series of grooves formed in the mold portion.

The compressible seal may be arranged such that it defines either a U-shaped cross section, a V-shaped cross section, or a hollow cross section. Specifically, the compressible seal may be arranged such that it defines V-shaped cross section with a seal base or an inverted V-shaped cross section with a seal base and an open apex. The compressible seal preferably defines a compressible dimension extending between the first mold portion and the second mold portion. The first mold portion and the compressible seal are preferably arranged such that the first mold portion mass contributes to compression of the compressible seal. The compressible seal preferably defines the entire periphery of the mold cavity and the brim cavity surrounds the periphery of the mold cavity.

The brim cavity may be bounded by an inner compressible seal, an outer compressible seal, the first mold portion, and the second mold portion, and the mold cavity may be bounded by the inner compressible seal, the first mold portion, and the second mold portion. Alternatively, the mold cavity may be bounded by the inner compressible seal, the first mold portion, the second mold portion, and a vacuum bag defining an atmospheric hollow included in the mold cavity.

In accordance with another embodiment of the present invention, a double chamber vacuum resin transfer molding process is provided comprising the initial step of providing a double chamber vacuum resin transfer molding apparatus comprising a first mold portion and a second mold portion. The first mold portion and the second mold portion are configured such that, in an engaged state, the first mold portion and the second mold portion define a mold cavity and a brim cavity. The mold cavity is isolated from the brim cavity by a compressible seal. Either or both of the first mold portion and the second mold portion are further configured to define an injection gate in communication with the mold cavity, a mold cavity vacuum port in communication with the mold cavity, and a brim cavity vacuum port in communication with the brim cavity. The first mold portion, the second mold portion, and the compressible seal are arranged such that a decrease in brim cavity pressure below atmospheric pressure causes a corresponding decrease in mold cavity volume.

A preform is provided and the molding apparatus is arranged in the engaged state such that the preform is positioned in the mold cavity. A resin is injected into the mold cavity via the injection gate. The mold cavity and the brim cavity are evacuated so as to compress the compressible seal, decrease the brim cavity pressure, decrease the mold cavity volume, and cause the injected resin to infiltrate the preform. The resin is cured in the mold cavity by maintaining the evacuated state in the brim cavity for an amount of time sufficient to cure the resin. The process may further comprise the step of releasing the vacuum in the mold cavity prior to the resin curing step.

In accordance with yet another embodiment of the present invention, a double chamber vacuum resin transfer molding process is provided comprising the initial step of providing a molding apparatus comprising a first mold portion and a second mold portion. The first mold portion and the second mold portion are configured such that, in an engaged state, the first mold portion and the second mold portion define a mold cavity and a brim cavity. The mold cavity is isolated from the brim cavity by a compressible seal. Either or both of the first mold portion and the second mold portion are further configured to define an injection gate and a mold cavity vacuum port in communication with the mold cavity and a brim cavity vacuum port in communication with the brim cavity. The first mold portion, the second mold portion, and the compressible seal are arranged such that a decrease in brim cavity pressure below atmospheric pressure causes a corresponding decrease in mold cavity volume. A preform is provided and the molding apparatus is arranged in the engaged state such that the preform is positioned in the mold cavity. The mold cavity and the brim cavity are evacuated so as to compress the compressible seal, decrease the brim cavity pressure, and decrease the mold cavity volume. A resin is injected into the evacuated mold cavity via the injection gate so as to cause the injected resin to infiltrate the preform. The evacuated state is maintained in the brim cavity for an amount of time sufficient to cure the resin in the mold cavity.

The first mold portion and the second mold portion may be further configured to define a plurality of injection gates in communication with the mold cavity and the injection gates are arranged to create a substantially uniform infiltration of resin in the preform.

In accordance with yet another embodiment of the present invention, a double chamber vacuum resin transfer molding process is provided wherein the first portion or the second mold portion, or both, are further configured to define a plurality of elongated mold portion voids formed in a surface bounding at least a portion of the mold cavity. The mold cavity and the brim cavity are evacuated so as to compress the compressible seal, decrease the brim cavity pressure, decrease the mold cavity volume, cause the injected resin to infiltrate the preform, and cause the preform to occupy the elongated mold portion voids. The preform may comprise first and second preform portions, wherein the first preform portion is characterized by a relatively high compressibility, wherein the second preform portion is characterized by a relatively low compressibility, and wherein the preform is provided such that the first preform portion is arranged so as to face the plurality of elongated mold portion voids.

Accordingly, it is an object of the present invention to provide a versatile, effective, and low cost scheme for manufacturing fiber reinforced composites. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
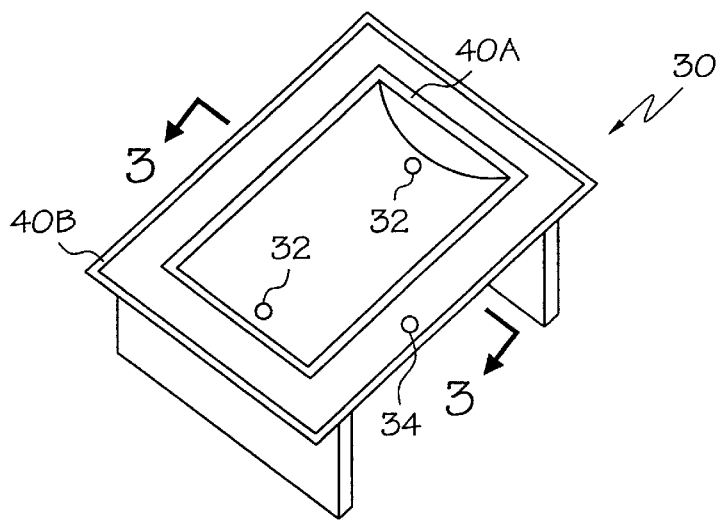
FIG. 1 is a schematic isometric illustration of a lower mold portion of a double chamber vacuum resin transfer molding apparatus according to the present invention.
Figure 2:
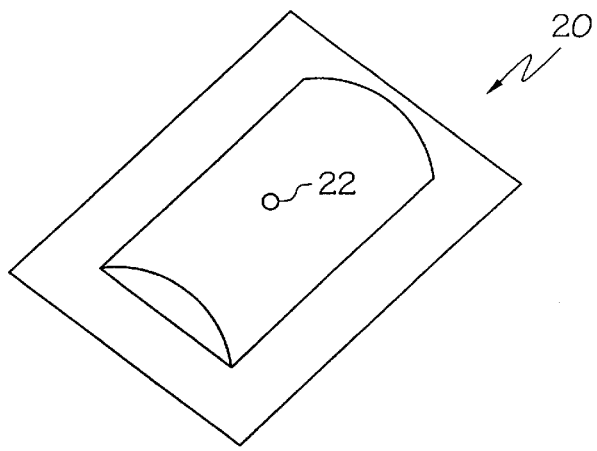
FIG. 2 is a schematic isometric illustration of an upper mold portion of a double chamber vacuum resin transfer molding apparatus according to the present invention.
Figure 3:
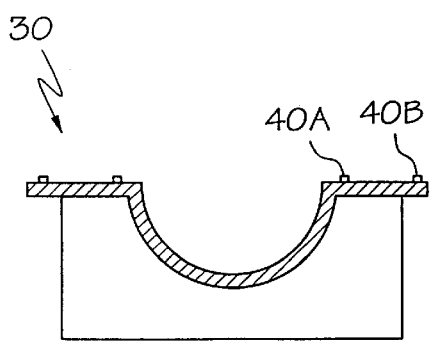
FIG. 3 is a schematic cross sectional view of the lower mold portion illustrated in FIG. 1, taken along line 3—3 of FIG. 1.
Figure 4:
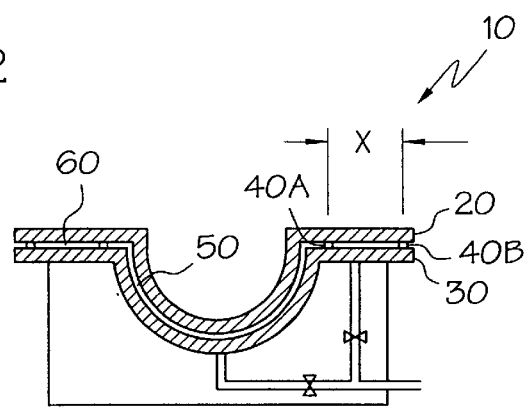
FIG. 4 is a schematic cross sectional view of the double chamber vacuum resin transfer molding apparatus according to the present invention, where the upper and lower mold portions are in an engaged state.

Referring initially to FIGS. 1–4, a double chamber vacuum resin transfer molding apparatus 10 is illustrated in detail. The molding apparatus 10 comprises an upper or first mold portion 20 (see FIG. 2), a lower or second mold portion 30 (see FIG. 1), and a compressible seal including an inner compressible seal 40A and an outer compressible seal 40B. The first mold portion 20 and the second mold portion 30 are configured such that, in an engaged state, the first mold portion 20 and the second mold portion 30 define a mold cavity 50 and a brim cavity 60. The mold cavity 50 is isolated from the brim cavity 60 by the inner compressible seal 40A. For the purposes of defining and describing the present invention, it is noted that cavities are considered to be isolated from each other if a fluid sealing arrangement is provided to inhibit the passage of fluid from one cavity to another.

In the illustrated embodiment, the first mold portion 20 is configured to define a resin injection gate 22 in communication with the mold cavity 50. As will be appreciated by those practicing the present invention, the second mold portion 30 may alternatively or additionally include a resin injection gate and, as described below, the first and second mold portions 20, 30 may include a plurality of injection gates. The resin injection gate 22 enables the high pressure introduction of a resin into the mold cavity 50.

Further, the second mold portion 30 is configured to define a pair of mold cavity vacuum ports 32 in communication with the mold cavity 50 and a brim cavity vacuum port 34 in communication with the brim cavity 60. As will be appreciated by those practicing the present invention, the first mold portion 20 may alternatively or additionally include respective vacuum ports therein. In this manner, each of the mold cavity 50 and the brim cavity 60 may be evacuated separately. In addition, vent ports (not shown) are provided in communication with the mold cavity 50 to provide exit passages for excess resin in the mold cavity 50.

The first mold portion 20, the second mold portion 30, and the compressible seal 40A, 40B are arranged such that a decrease in brim cavity pressure below atmospheric pressure causes a corresponding decrease in mold cavity volume. Stated differently, the mold cavity 50 is physically compressed as the brim cavity 60 is evacuated. Accordingly, a preform positioned in the mold cavity 50 during brin cavity 60 evacuation will be squeezed or compressed between the first mold portion 20 and the second mold portion 30.

The brim cavity 60 is arranged about the periphery of the mold cavity 50 and defines a brim cavity width X. The project area of the brim cavity 60, i.e., the two-dimensional area defined by the brim cavity along its width dimension, depends on the fiber preform compressibility and the required fiber content of the composite to be formed. For a relatively high fiber content composite, the cavity width X should be relatively large to enable creation of a relatively large amount of compression within the mold cavity 50. For example, according to one embodiment of the present invention, the maximum pressure exerted on the object in the mold cavity 50 is about $2 \times 10^5$ Pa (29 psi) when the brim cavity width X is about 19 cm (7.5") and the project area of the mold cavity 50 is about 0.85 m² (9 ft²) According to certain embodiments of the present invention, the area occupied by the brim cavity 60 should approximate the project area of the mold cavity 50 to optimize the pressure exerted on the compressible seal 40A, 40B and on any object in the mold cavity 50 as a result of the vacuum in the brim cavity 60. The brim width x is typically uniform but may be varied along the periphery of the mold cavity 50 to account for specific requirements of mold filling, variations in preform thickness, and variations in preform fiber content.

The inner compressible seal 40A defines the entire periphery of the mold cavity 50 and the brim cavity 60 surrounds the periphery of the mold cavity 50. The brim cavity 60 is bounded by the inner compressible seal 40A, the outer compressible seal 40B, the first mold portion 20, and the second mold portion 30. The mold cavity 50 is bounded by the inner compressible seal 40A, the first mold portion 20, and the second mold portion 30.

The first and second mold portions 20, 30 define respective first and second complementary geometrical profiles to enable uniform compression within the mold cavity 50. Specifically, as is illustrated in FIGS. 1–4, the first and second mold portions 20, 30 define complementary semicircular profiles.

Figure 6:
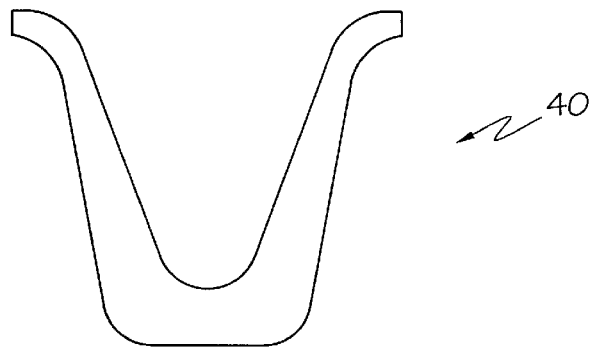
FIGS. 6–8 are cross sectional illustrations of compressible seals according to the present invention.

The compressible seal 40A, 40B defines a compressible dimension extending between the first mold portion 20 and the second mold portion 30. The compressible dimension varies from an uncompressed value to a compressed value that is about 3 mm to 15 about mm less than the uncompressed value. The particular compressible dimension suitable for different embodiments of the present application depends upon the compressibility of the fiber preform and the pressure exerted on a preform in the mold cavity as a result of the vacuum in the brim cavity 50 and the mold cavity 60. According to the embodiment of the present invention illustrated in FIG. 6, the compressible seal 40A, 40B is arranged to define a U-shaped cross section. The compressible seal 40A, 40B may also define a V-shaped cross section with a seal base (see FIG. 7), an inverted V-shaped cross section with a seal base and an open apex (see FIG. 8), or a hollow cross section.

As is noted above, the evacuation of the brim cavity 60 and the mold cavity 50 contribute to the compression of the compressible seal 40A, 40B The mass of the first mold portion 20 also contributes to compression of the compressible seal 40A, 40B In one embodiment of the present invention, the compressible seal 40A, 40B and the first mold portion 20 are arranged such that the seal is sufficiently compressed under a brim cavity pressure of about 750 Torr and a mold cavity pressure of about 750 Torr. Alternatively, where the mold cavity 50 is maintained at atmospheric pressure, the compressible seal 40A, 40B and the first mold portion 20 are arranged such that a sufficient seal may be attained by merely reducing the brim cavity pressure to about 750 Torr. It is noted that these values are merely illustrative in nature and may vary significantly in practicing the present invention.

Figure 5:
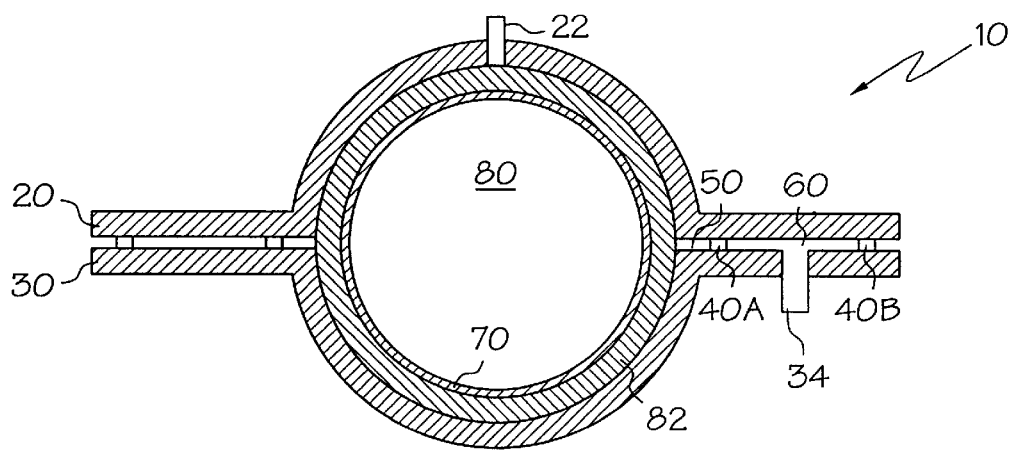
FIG. 5 is a schematic cross sectional view of a double chamber vacuum resin transfer molding apparatus according to an alternative embodiment of the present invention.

Referring now to FIG. 5, an alternative embodiment of the molding apparatus 10 of the present invention is illustrated. As is the case in the embodiment of FIGS. 1–4, the brim cavity 60 is bounded by the inner compressible seal 40A, the outer compressible seal 40B, the first mold portion 20, and the second mold portion 30. In contrast, the mold cavity 50 is bounded by the inner compressible seal 40A, the first mold portion 20, the second mold portion 30, and a vacuum bag 70. The mold cavity 50 includes an atmospheric hollow 80 defined by the vacuum bag 70 at a central portion of the molding apparatus 10. As will be appreciated by those practicing the present invention, the embodiment of FIG. 5 is particularly advantageous for fabricating hollow reinforced composites from a compressed preform 82.

Figure 11:
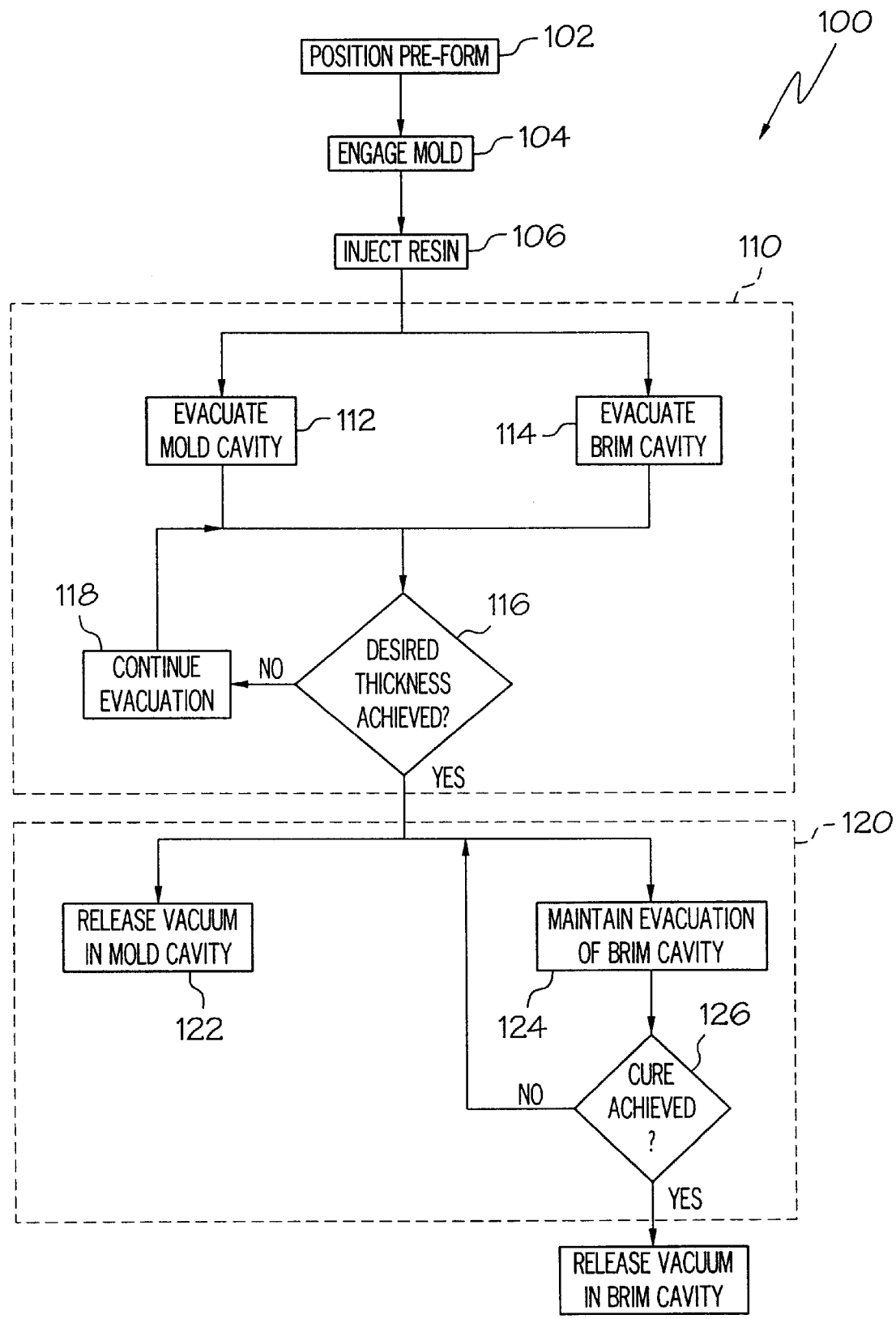
FIGS. 11 and 12 are flow charts illustrating additional resin transfer molding processes according to the present invention.

Referring now to FIGS. 1–4 and the flow chart of FIG. 11, a resin transfer molding process 100 utilizing the double chamber vacuum resin transfer molding apparatus of the present invention is described in detail. Initially, according to the molding process 100 illustrated in FIG. 11, a fiber preform is positioned in the mold cavity 50 (see step 102) and the molding apparatus 10 is arranged in the engaged state (see step 104). As is noted above, in the engaged state, the first mold portion 20 and the second mold portion 30 are positioned to define respective isolated mold and brim cavities 50, 60. Next, a resin is injected into the mold cavity 50 via the injection gate 22 (see step 106).

The compression molding steps 110 of the process of the present invention are executed following resin injection. In compression molding, the injection of the resin through the injection gate 22 is typically at high pressure and often results in the formation of a gap between the first mold portion 20 and the fiber preform within the mold cavity 50. As a result, resin tends to distribute along the surface of the fiber preform. Following injection, the mold cavity 50 and the brim cavity 60 are evacuated so as to compress the compressible seal 40A, 40B, decrease the mold cavity volume, and cause the injected resin to infiltrate the compressed preform (see steps 112 and 114). It may be said that the resin infiltrates the preform through pulling, by the vacuum within the mold cavity 50, and through pushing, by the compressive force created between the first and second mold portions 20, 30. It is noted that the brim cavity 60 and the mold cavity 50 may be evacuated simultaneously. Alternatively, the brim cavity 60 may be evacuated following evacuation of the mold cavity 50. Evacuation continues until the preform in the mold cavity 50 reaches a desired compressed thickness (see steps 116, 118).

The composite curing steps 120 of the process of the present invention are executed following resin injection and compression molding. The vacuum in the brim cavity 60 is maintained for an amount of time sufficient to cure the resin infiltrated preform (see steps 124 and 126). Typically, the vacuum in the mold cavity 50 is released during curing (see step 122). As will be appreciated by those practicing the present invention, the resin injection pressure in the mold cavity 50, the compressibility of the fiber preform, and the vacuum strength in the brim cavity 60 are inter-related variables that must be considered collectively in product fabrication.

Figure 12:
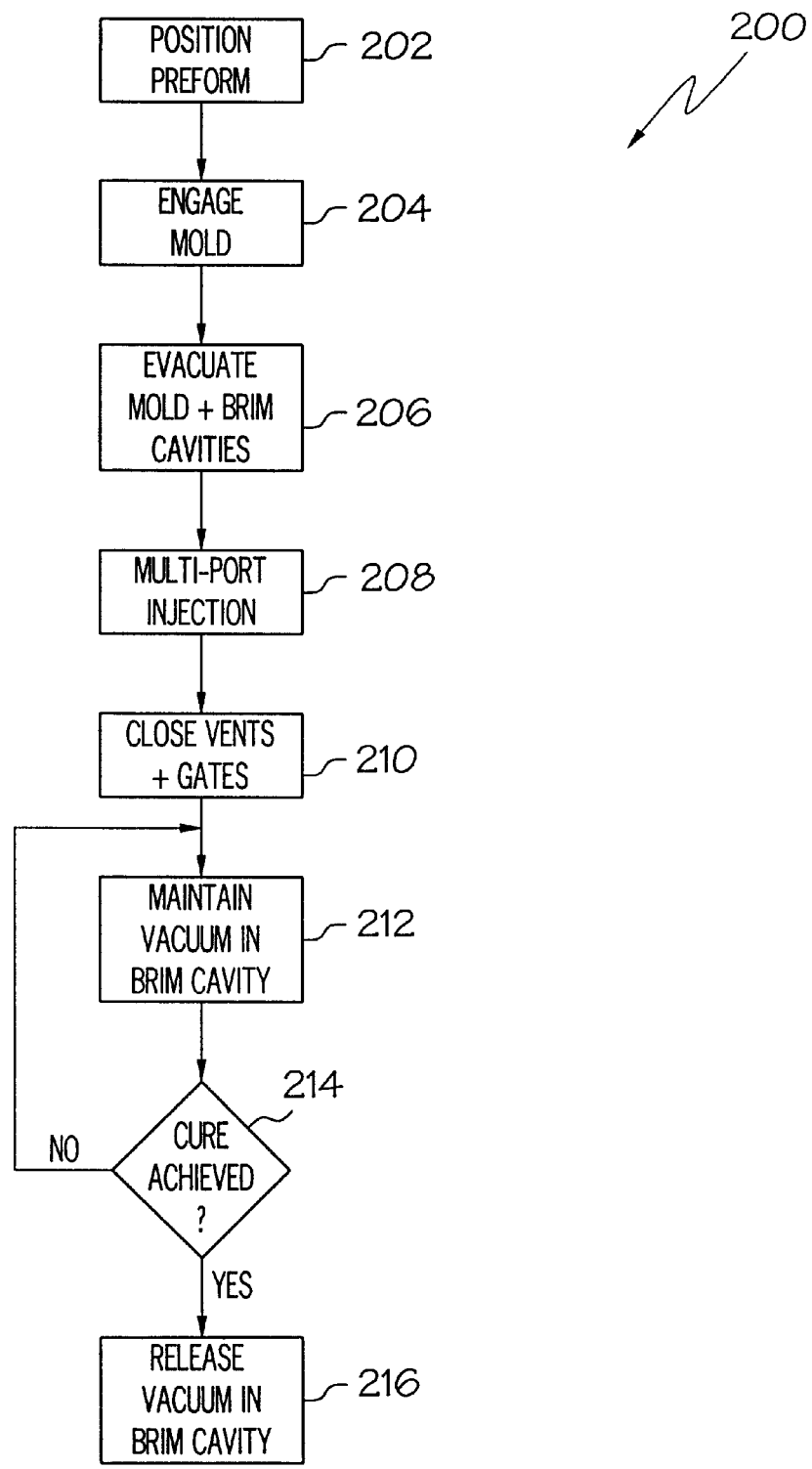

Referring now to FIGS. 1–4 and the flow chart of FIG. 12, an additional resin transfer molding process 200 utilizing the double chamber vacuum resin transfer molding apparatus of the present invention is described in detail. Initially, according to the molding process 200 illustrated in FIG. 12, a fiber preform is positioned in the mold cavity 50 (see step 202) and the molding apparatus 10 is arranged in the engaged state (see step 204). Next, the mold cavity 50 and the brim cavity 60 are evacuated so as to compress the compressible seal 40A, 40B and decrease the mold cavity volume (see step 206).

Resin is injected into the evacuated mold cavity 50 via the injection gate 22 so as to cause the injected resin to infiltrate the preform (see step 208). The evacuation of the brim cavity 60 enables injection at relatively high pressures and, as such, improves resin infiltration. Typically, it is most advantageous to execute multi-port injection to ensure uniform resin infiltration. The multi-port injection may be simultaneous or sequential, depending upon the particular arrangement of the mold and the properties of the fiber preform. During injection, selected vents are opened to permit venting of excess resin. The number and positioning of the opened vents are dependent upon the particular mold design. Following resin injection, the selected vent gates are closed (see step 210) and the evacuated state in the brim cavity 60 is maintained for an amount of time sufficient to cure the resin in the mold cavity 50 (see steps 212, 214, and 216).

Figure 9:
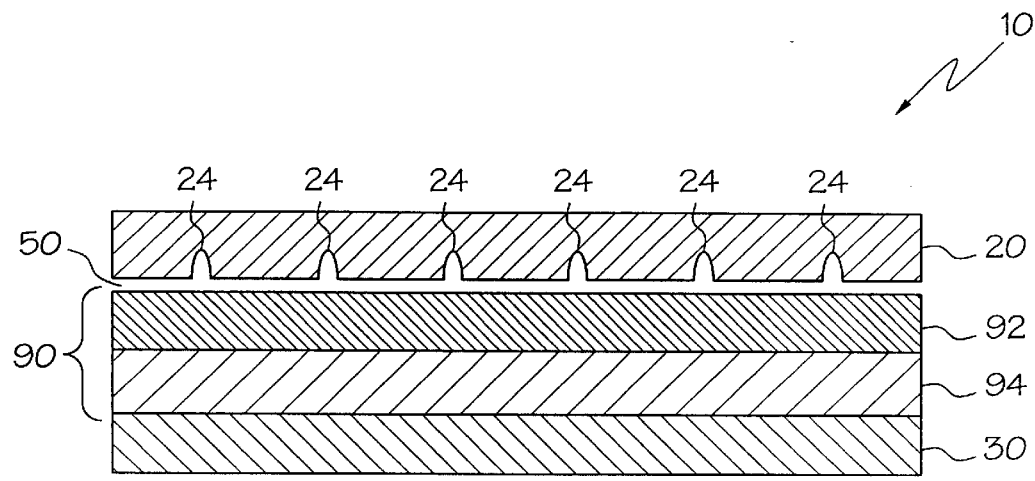
FIGS. 9 and 10 are schematic illustrations of a resin transfer molding process according to the present invention.
Figure 10:
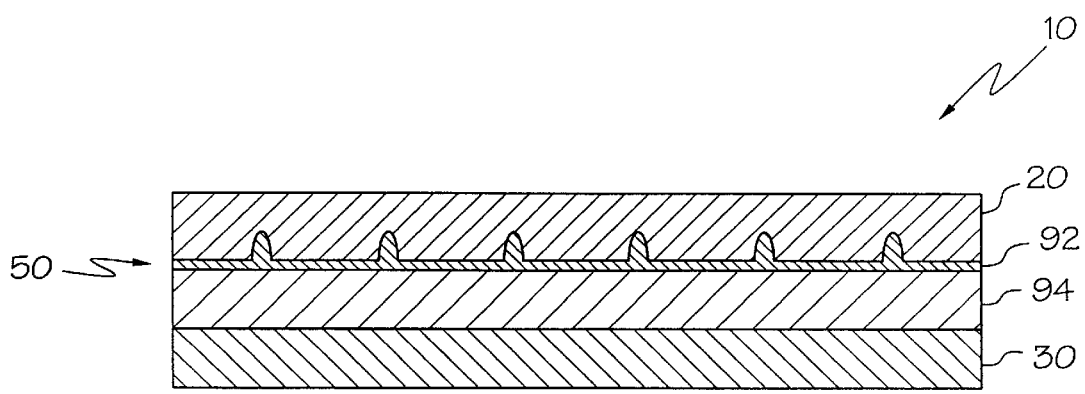

FIGS. 9 and 10 illustrate schematically an alternative embodiment of the molding method and apparatus 10 of the present invention where one of the molding surfaces is modified so as to enable fabrication of a reinforced composite including elongate structural reinforcing members. Specifically, according to this embodiment, the first mold portion 20 is configured to define a plurality of elongated mold portion voids 24 in a surface bounding a portion of the mold cavity 50. Typically, the elongated mold portion voids 24 comprise a series of grooves formed in the first mold portion 20. As will be appreciated by those practicing the present invention, only a portion of the molding apparatus 10 of the present invention is illustrated in FIGS. 9 and 10.

A preform 90 is provided and positioned in the mold cavity 50 and resin is subsequently injected into the mold cavity 50 via one or more injection gates (not shown). Next, the mold cavity 50 and the brim cavity (not shown) are evacuated to decrease the mold cavity volume and squeeze the preform 90, causing portions of the preform 90 to occupy the elongated mold portion voids 24. The evacuated state in the brim cavity is maintained for an amount of time sufficient to cure the resin. The resulting cured composite includes elongate reinforcement members integrally formed therein corresponding to the arrangement of the elongated mold portion voids 24.

Figures 7, 8:
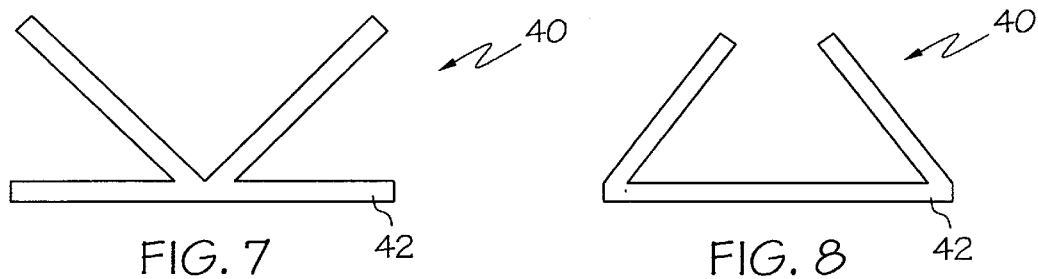

In the illustrated embodiment, the preform 90 is provided with first and second preform portions 92, 94 of different compressibility to increase the effectiveness of the process of FIGS. 7 and 8. Specifically, the first preform portion 92 is characterized by a relatively high compressibility and the second preform portion 94 is characterized by a relatively low compressibility. The relatively high compressibility of the first preform portion 92 is well suited for integration into the elongated mold portion voids 24 and, as such, is arranged so as to face the voids 24. The second preform portion 94 is described herein as being characterized by a relatively low compressibility merely because its compensability is low when compared to the compressibility of the first preform portion 92. Typically, the second preform portion 92 comprises any preform material that is well-suited for fabrication of fiber reinforced composites. The first preform portion 92 is typically similar in structure to the second preform portion 94, with the exception that it is characterized by a relatively high compressibility.

Having described the invention in detail and by reference to preferred embodiments thereof, it will be apparent that modifications and variations are possible without departing from the scope of the invention defined in the appended claims.

What is claimed is:

1. A double chamber vacuum resin transfer molding apparatus comprising a first mold portion and a second mold portion, wherein:

said first mold portion and said second mold portion are configured such that, in an engaged state, said first mold portion and said second mold portion define a mold cavity and a brim cavity;

said mold cavity is isolated from said brim cavity by a compressible seal;

at least one of said first mold portion and said second mold portion is further configured to define an injection gate in communication with said mold cavity;

at least one of said first mold portion and said second mold portion is further configured to define a mold cavity vacuum port in communication with said mold cavity and a brim cavity vacuum port in communication with said brim cavity; and said first mold portion, said second mold portion, and said compressible seal are arranged such that a decrease in brim cavity pressure below atmospheric pressure causes a corresponding decrease in mold cavity volume.

2. A double chamber vacuum resin transfer molding apparatus as claimed in claim 1 wherein said brim cavity is arranged about the periphery of said mold cavity.

3. A double chamber vacuum resin transfer molding apparatus as claimed in claim 1 wherein said first and second mold portions define respective first and second complementary geometrical profiles.

4. A double chamber vacuum resin transfer molding apparatus as claimed in claim 1 wherein at least one of said first and second mold portions is configured to define a plurality of elongated mold portion voids formed in a surface bounding at least a portion of said mold cavity.

5. A double chamber vacuum resin transfer molding apparatus as claimed in claim 4 wherein said elongated mold portion voids comprise a series of grooves formed in said mold portion.

6. A double chamber vacuum resin transfer molding apparatus as claimed in claim 1 wherein said compressible seal is arranged such that it defines one of a U-shaped cross section, a V-shaped cross section, and a hollow cross section.

7. A double chamber vacuum resin transfer molding apparatus as claimed in claim 1 wherein said compressible seal is arranged such that it defines V-shaped cross section with a seal base.

8. A double chamber vacuum resin transfer molding apparatus as claimed in claim 1 wherein said compressible seal is arranged such that it defines an inverted V-shaped cross section with a seal base and an open apex.

9. A double chamber vacuum resin transfer molding apparatus as claimed in claim 1 wherein said compressible seal defines a compressible dimension extending between said first mold portion and said second mold portion.

10. A double chamber vacuum resin transfer molding apparatus as claimed in claim 9 wherein said compressible seal is arranged such that said compressible dimension varies from an uncompressed value to a compressed value, wherein said compressed value is about 3 to about 15 mm less than said uncompressed value.

11. A double chamber vacuum resin transfer molding apparatus as claimed in claim 10 wherein said first mold portion is characterized by a first mold portion mass, wherein said first mold portion and said compressible seal are arranged such that said first mold portion mass contributes to compression of said compressible seal.

12. A double chamber vacuum resin transfer molding apparatus as claimed in claim 10 wherein said compressible seal and said first mold portion are arranged such that said compressed value of said compressible dimension is attained where said brim cavity pressure is about 750 Torr and said mold cavity pressure is about 750 Torr.

13. A double chamber vacuum resin transfer molding apparatus as claimed in claim 10 wherein said compressible seal and said first mold portion are arranged such that said compressed value of said compressible dimension is attained where said brim cavity pressure is about 750 Torr and said mold cavity pressure is substantially equal to atmospheric pressure.

14. A double chamber vacuum resin transfer molding apparatus as claimed in claim 1 wherein said compressible seal defines the entire periphery of said mold cavity and wherein said brim cavity surrounds said periphery of said mold cavity.

15. A double chamber vacuum resin transfer molding apparatus as claimed in claim 1 wherein said brim cavity is bounded by an inner compressible seal and an outer compressible seal, and wherein said mold cavity is bounded by said inner compressible seal.

16. A double chamber vacuum resin transfer molding apparatus as claimed in claim 1 wherein said brim cavity is bounded by an inner compressible seal, an outer compressible seal, said first mold portion, and said second mold portion, and wherein said mold cavity is bounded by said inner compressible seal, said first mold portion, and said second mold portion.

17. A double chamber vacuum resin transfer molding apparatus as claimed in claim 1 wherein said brim cavity is bounded by an inner compressible seal, an outer compressible seal, said first mold portion, and said second mold portion, and wherein said mold cavity is bounded by said inner compressible seal, said first mold portion, said second mold portion, and a vacuum bag.

18. A double chamber vacuum resin transfer molding apparatus as claimed in claim 17 wherein said vacuum bag further defines an atmospheric hollow.

19. A double chamber vacuum resin transfer molding apparatus as claimed in claim 1 wherein said mold cavity is arranged to include an atmospheric hollow.

20. A double chamber vacuum resin transfer molding apparatus as claimed in claim 19 wherein said atmospheric hollow is defined by a vacuum bag.

21. A double chamber vacuum resin transfer molding process comprising the steps of:
   providing a double chamber vacuum resin transfer molding apparatus comprising a first mold portion and a second mold portion, wherein
      said first mold portion and said second mold portion are configured such that, in an engaged state, said first mold portion and said second mold portion define a mold cavity and a brim cavity,
      said mold cavity is isolated from said brim cavity by a compressible seal,
      at least one of said first mold portion and said second mold portion is further configured to define an injection gate in communication with said mold cavity,
      at least one of said first mold portion and said second mold portion is further configured to define a mold cavity vacuum port in communication with said mold cavity and a brim cavity vacuum port in communication with said brim cavity, and
      said first mold portion, said second mold portion, and said compressible seal are arranged such that a decrease in brim cavity pressure below atmospheric pressure causes a corresponding decrease in mold cavity volume;
   providing a preform and arranging said molding apparatus in said engaged state such that said preform is positioned in said mold cavity;
   injecting a resin into said mold cavity via said injection gate;
   evacuating said mold cavity and said brim cavity so as to compress said compressible seal, decrease said brim cavity pressure, decrease said mold cavity volume, and cause said injected resin to infiltrate said preform; and
   curing said resin in said mold cavity by maintaining said evacuated state in said brim cavity for an amount of time sufficient to cure said resin.

22. A double chamber vacuum resin transfer molding process as claimed in claim 21 further comprising the step of releasing said vacuum in said mold cavity prior to said resin curing step.

23. A double chamber vacuum resin transfer molding process comprising the steps of:
   providing a double chamber vacuum resin transfer molding apparatus comprising a first mold portion and a second mold portion, wherein
      said first mold portion and said second mold portion are configured such that, in an engaged state, said first mold portion and said second mold portion define a mold cavity and a brim cavity,
      said mold cavity is isolated from said brim cavity by a compressible seal,
      at least one of said first mold portion and said second mold portion is further configured to define an injection gate in communication with said mold cavity,
      at least one of said first mold portion and said second mold portion is further configured to define a mold cavity vacuum port in communication with said mold cavity and a brim cavity vacuum port in communication with said brim cavity, and
      said first mold portion, said second mold portion, and said compressible seal are arranged such that a decrease in brim cavity pressure below atmospheric pressure causes a corresponding decrease in mold cavity volume;
   providing a preform and arranging said molding apparatus in said engaged state such that said preform is positioned in said mold cavity;
   evacuating said mold cavity and said brim cavity so as to compress said compressible seal, decrease said brim cavity pressure, and decrease said mold cavity volume;
   injecting a resin into said evacuated mold cavity via said injection gate so as to cause said injected resin to infiltrate said preform; and
   maintaining said evacuated state in said brim cavity for an amount of time sufficient to cure said resin in said mold cavity.

24. A double chamber vacuum resin transfer molding process as claimed in claim 23 wherein said first mold portion and said second mold portion are further configured to define a plurality of injection gates in communication with said mold cavity and wherein said injection gates are arranged to create a substantially uniform infiltration of resin in said preform.

25. A double chamber vacuum resin transfer molding process comprising the steps of:
   providing a double chamber vacuum resin transfer molding apparatus comprising a first mold portion and a second mold portion, wherein
      said first mold portion and said second mold portion are configured such that, in an engaged state, said first mold portion and said second mold portion define a mold cavity and a brim cavity,
      said mold cavity is isolated from said brim cavity by a compressible seal, at least one of said first and second mold portions is further configured to define an injection gate in communication with said mold cavity and a plurality of elongated mold portion voids formed in a surface bounding at least a portion of said mold cavity, at least one of said first mold portion and said second mold portion is further configured to define a mold cavity vacuum port in communication with said mold cavity and a brim cavity vacuum port in communication with said brim cavity, and said first mold portion, said second mold portion, and said compressible seal are arranged such that a decrease in brim cavity pressure below atmospheric pressure causes a corresponding decrease in mold cavity volume;

providing a preform and arranging said molding apparatus in said engaged state such that said preform is positioned in said mold cavity;

injecting a resin into said mold cavity via said injection gate;

evacuating said mold cavity and said brim cavity so as to compress said compressible seal, decrease said brim cavity pressure, decrease said mold cavity volume, cause said injected resin to infiltrate said preform, and cause said preform to occupy said elongated mold portion voids; and curing said resin in said mold cavity by maintaining said evacuated state in said brim cavity for an amount of time sufficient to cure said resin.

26. A double chamber vacuum resin transfer molding process as claimed in claim 25 wherein said preform comprises first and second preform portions, wherein said first preform portion is characterized by a relatively high compressibility, wherein said second preform portion is characterized by a relatively low compressibility, and wherein said preform is provided such that said first preform portion is arranged so as to face said plurality of elongated mold portion voids.

* * * * *